(12) United States Patent
Terada

(10) Patent No.: US 9,782,896 B2
(45) Date of Patent: Oct. 10, 2017

(54) ROBOT SYSTEM AND CONTROL METHOD FOR ROBOT SYSTEM

(71) Applicant: Mitsubishi Electric Corporation, Chiyoda-ku, Tokyo (JP)

(72) Inventor: Daisuke Terada, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/039,960

(22) PCT Filed: Jul. 29, 2014

(86) PCT No.: PCT/JP2014/069939
§ 371 (c)(1),
(2) Date: May 27, 2016

(87) PCT Pub. No.: WO2015/079740
PCT Pub. Date: Jun. 4, 2015

(65) Prior Publication Data
US 2017/0028550 A1    Feb. 2, 2017

(30) Foreign Application Priority Data
Nov. 28, 2013 (JP) ................. 2013-246380

(51) Int. Cl.
*B25J 9/00*    (2006.01)
*B25J 9/16*    (2006.01)

(52) U.S. Cl.
CPC ............. *B25J 9/162* (2013.01); *B25J 9/1656* (2013.01)

(58) Field of Classification Search
CPC combination set(s) only.
See application file for complete search history.

(56) References Cited

U.S. PATENT DOCUMENTS 4,201,937 A * 5/1980 Irie .................. B25J 9/0093
                                                    318/568.11
4,613,943 A * 9/1986 Miyake ................ B23K 9/12
                                                    318/568.2
(Continued)

FOREIGN PATENT DOCUMENTS

JP    62-120099 A    6/1987
JP    4-152084 A    5/1992
(Continued)

OTHER PUBLICATIONS

Communication dated Jan. 5, 2017, from the State Intellectual Property Office of People's Republic of China in counterpart Application No. 201480065188.6.
(Continued)

*Primary Examiner* — Jonathan L Sample
(74) *Attorney, Agent, or Firm* — Sughrue Mion, PLLC; Richard C. Turner

(57) ABSTRACT

A robot system includes a robot including a main body, an arm and a hand as a movable unit, a control unit, and a storage unit. A teaching position is registered in the storage unit. In advance preparation of the robot installed in a working position, the control unit moves the movable unit based on the control amount registered in the storage unit, and registers in the storage unit reference position data representing a positional relation between a workpiece picked up by the movable unit and the main body or a positional relation between the main body and the movable unit. When the robot is reinstalled and when the robot is relocated, the control unit moves the movable unit based on the control amount, registers a difference between position data and the reference position data in the storage unit, and corrects the teaching position based on the difference.

9 Claims, 18 Drawing Sheets

(56) References Cited

U.S. PATENT DOCUMENTS

| | | | | |
|---|---|---|---|---|
| 4,642,447 | A * | 2/1987 | Detriche | G05B 19/425 219/125.1 |
| 4,831,316 | A * | 5/1989 | Ishiguro | G05B 19/425 318/573 |
| 4,831,549 | A * | 5/1989 | Red | B25J 9/1692 700/254 |
| 5,006,999 | A * | 4/1991 | Kuno | G05B 19/425 219/124.34 |
| 5,727,132 | A * | 3/1998 | Arimatsu | G05B 19/4083 700/259 |
| 5,799,135 | A * | 8/1998 | Terawaki | B25J 9/1679 700/258 |
| 6,642,922 | B1 * | 11/2003 | Noda | B25J 9/1671 345/419 |
| 6,822,412 | B1 * | 11/2004 | Gan | B25J 9/1692 318/568.11 |
| 6,836,702 | B1 * | 12/2004 | Brogårdh | B23K 26/04 318/568.1 |
| 7,881,917 | B2 * | 2/2011 | Nagatsuka | B25J 9/1671 703/6 |
| 8,108,092 | B2 * | 1/2012 | Phillips | G05D 1/0033 700/245 |
| 8,457,791 | B2 * | 6/2013 | Shi | B25J 9/1697 700/1 |
| 8,571,714 | B2 * | 10/2013 | Gienger | G05B 19/42 318/568.16 |
| 9,089,971 | B2 * | 7/2015 | Aoba | B25J 9/1697 |
| 2003/0078694 | A1 * | 4/2003 | Watanabe | B25J 9/1697 700/245 |
| 2003/0144765 | A1 * | 7/2003 | Habibi | B25J 9/1697 700/259 |
| 2003/0208302 | A1 * | 11/2003 | Lemelson | G05B 19/19 700/245 |
| 2004/0189675 | A1 * | 9/2004 | Pretlove | B25J 9/1656 345/633 |
| 2004/0254677 | A1 * | 12/2004 | Brogardh | B23K 26/04 700/245 |
| 2005/0096892 | A1 * | 5/2005 | Watanabe | B25J 9/1671 703/7 |
| 2005/0107919 | A1 * | 5/2005 | Watanabe | B25J 9/1656 700/245 |
| 2005/0107920 | A1 * | 5/2005 | Ban | B25J 9/1692 700/245 |
| 2006/0149421 | A1 * | 7/2006 | Akiyama | B25J 9/1664 700/245 |
| 2007/0239315 | A1 * | 10/2007 | Sato | B25J 9/1612 700/245 |
| 2007/0276541 | A1 * | 11/2007 | Sawasaki | G05D 1/0246 700/253 |
| 2007/0282485 | A1 * | 12/2007 | Nagatsuka | B25J 9/1671 700/245 |
| 2008/0013825 | A1 * | 1/2008 | Nagatsuka | B25J 9/1671 382/153 |
| 2008/0249659 | A1 * | 10/2008 | Ueyama | B25J 9/0018 700/245 |
| 2008/0267450 | A1 * | 10/2008 | Sugimoto | A63H 17/395 382/103 |
| 2009/0187276 | A1 * | 7/2009 | Nagatsuka | B25J 9/1697 700/245 |
| 2011/0106339 | A1 * | 5/2011 | Phillips | G05D 1/0033 701/2 |
| 2011/0218776 | A1 * | 9/2011 | Shono | G06F 17/50 703/1 |
| 2012/0166165 | A1 * | 6/2012 | Nogami | B25J 9/1671 703/6 |
| 2012/0294509 | A1 * | 11/2012 | Matsumoto | B25J 5/007 382/153 |
| 2013/0054025 | A1 * | 2/2013 | Ito | B25J 9/1697 700/246 |
| 2013/0238131 | A1 * | 9/2013 | Kondo | B25J 9/1697 700/259 |
| 2013/0266205 | A1 * | 10/2013 | Valpola | B25J 9/1669 382/153 |
| 2013/0293410 | A1 * | 11/2013 | Hieronimi | G01S 11/02 342/190 |
| 2014/0009583 | A1 * | 1/2014 | Suzuki | G06T 7/0065 348/46 |
| 2014/0163736 | A1 * | 6/2014 | Azizian | A61B 19/2203 700/259 |

FOREIGN PATENT DOCUMENTS

| | | |
|---|---|---|
| JP | 4-290104 A | 10/1992 |
| JP | 4-293108 A | 10/1992 |
| JP | 5-11822 A | 1/1993 |
| JP | 6-110543 A | 4/1994 |
| JP | 8-39468 A | 2/1996 |
| JP | 2005-334998 A | 12/2005 |
| JP | 2006-82170 A | 3/2006 |
| JP | 2012-76216 A | 4/2012 |
| JP | 2012-196749 A | 10/2012 |
| JP | 2013-132726 A | 7/2013 |

OTHER PUBLICATIONS

International Search Report for PCT/JP2014/069939 dated Oct. 28, 2014.
Japanese Notice of Rejection for 2015-550585 issued Apr. 28, 2016.

* cited by examiner

ROBOT SYSTEM AND CONTROL METHOD FOR ROBOT SYSTEM

CROSS REFERENCE TO RELATED APPLICATIONS

This application is a National Stage of International Application No. PCT/JP2014/069939 filed Jul. 29, 2014, claiming priority based on Japanese Patent Application No. 2013-246380 filed Nov. 28, 2013, the contents of all of which are incorporated herein by reference in their entirety.

FIELD

The present invention relates to a robot system and a control method for the robot system, and relates to correction of a teaching position when a robot is reinstalled and when a robot is relocated.

BACKGROUND

On a production line along which robots are operated, if a robot fails, the robot is sometimes temporarily removed from the production line and then reinstalled after being repaired. Further, a robot is sometimes relocated when the production line on which robots are operated is to be switched and when operators work on the production line.

When a robot is installed in a working position, a robot operator performs a teaching operation for teaching the robot the transport route of workpieces. In the teaching operation, the robot operator causes the robot to store a teaching position, which is a point on the transport route. When a robot that has been moved from a working position on the production line is reinstalled in the same working position, some changes occur in the positional relation between the transport route of the workpieces and the robot. Further, when a robot is relocated from the initial working position to another working position and when a robot that has been moved from the initial working position is reinstalled in the original working position, the robot operator sometimes performs the teaching operation on the robot again.

Patent Literature 1 discloses a direct teaching device that acquires teaching data by positioning an arm attached with a tactile sensor in a teaching position. When an operator moves the arm to a desired teaching position, the direct teaching device acquires the coordinates of the teaching position.

CITATION LIST

Patent Literature

Patent Literature 1: Japanese Patent Application Laid-open No. H6-110543

SUMMARY

Technical Problem

With conventional techniques, it is necessary for a teaching operation to be performed by a robot operator having a high robot-handling skill every time the robot is reinstalled or relocated. Further, because it is necessary to perform the teaching operation every time a robot is relocated or reinstalled, a robot operator has considerable workloads.

The present invention has been achieved in view of the above problems, and an object of the present invention is to provide a robot system and a control method for the robot system, in which it is not necessary to perform a teaching operation when a robot is reinstalled and when a robot is relocated and in which a teaching position registered in the robot can be corrected by an operator with less laborious work regardless of the operator's robot-handling skill.

Solution to Problem

In order to solve the above problems and achieve the object, a robot system according to an aspect of the present invention includes a robot including a main body, a movable unit that is coupled to the main body and that picks up and transports a workpiece, a control unit that controls a movement of the movable unit, and a storage unit that stores therein data for control of the movable unit in the control unit, wherein a teaching position for teaching the robot a transport route of a workpiece is registered in the storage unit, in advance preparation of the robot installed in a working position, the control unit moves the movable unit on a basis of an amount of control registered in the storage unit, and registers in the storage unit reference position data representing a positional relation between a workpiece picked up by the movable unit and the main body or a positional relation between the movable unit and the main body, when the robot moved from the working position is reinstalled in the working position and when the robot is relocated from the working position to another working position, the control unit moves the movable unit on a basis of the amount of control, when the reference position data representing a positional relation between a workpiece and the main body is registered in the storage unit, the control unit registers a difference between position data representing a positional relation between a workpiece picked up by the movable unit and the main body and the reference position data in the storage unit, when the reference position data representing a positional relation between the movable unit and the main body is registered in the storage unit, the control unit registers a difference between position data representing a positional relation between the movable unit and the main body and the reference position data in the storage unit, and the control unit corrects the teaching position on a basis of the difference read from the storage unit.

Advantageous Effects of Invention

According to the present invention, the robot system registers the difference between reference position data registered in a storage unit in advance preparation of a robot and position data acquired after the robot is reinstalled or relocated in the storage unit. A control unit corrects the teaching position on the basis of the difference. When the robot is reinstalled and when the robot is relocated, the robot system corrects the teaching position instead of a teaching operation for teaching the robot the transport route. Accordingly, a robot operator does not need to perform the teaching operation when the robot is reinstalled and the robot is relocated, and can correct the teaching position registered in the robot with less laborious work regardless of the operator's robot-handling skill.

DESCRIPTION OF EMBODIMENTS

Exemplary embodiments of a robot system and a control method for the robot system according to the present invention will be explained below in detail with reference to the accompanying drawings. The present invention is not limited to the embodiments.

First Embodiment

Figure 1:
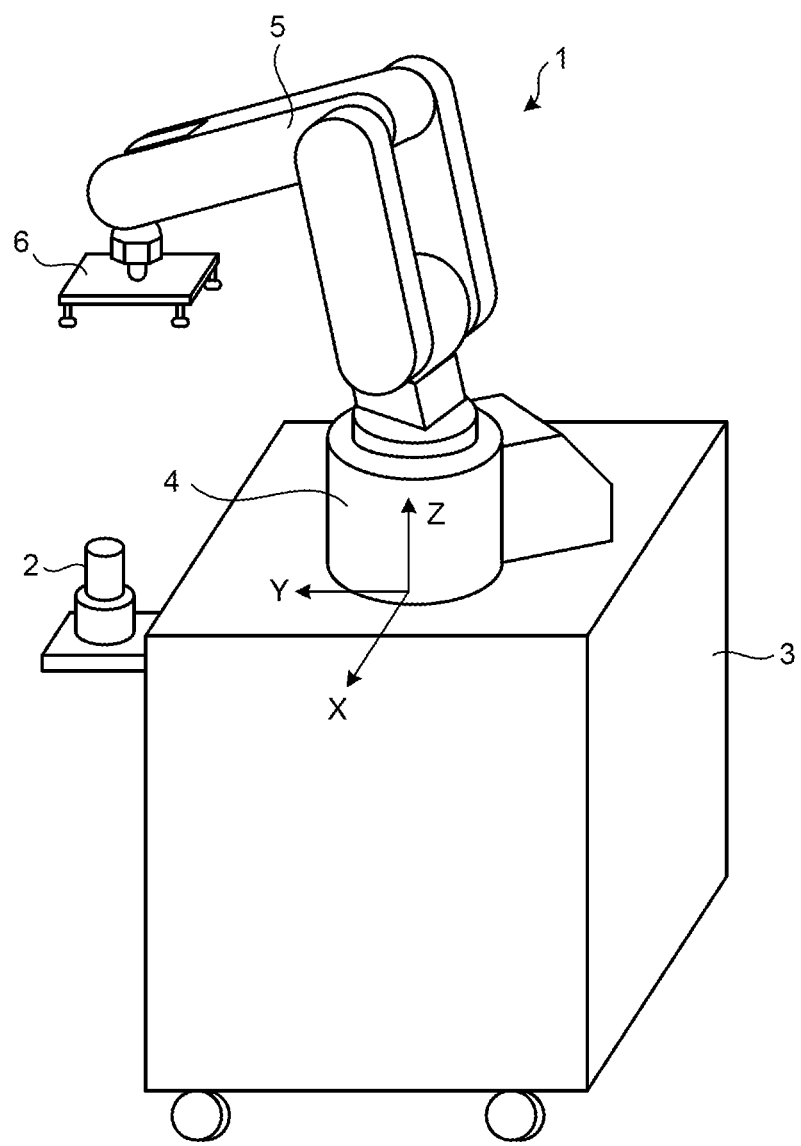
FIG. 1 is a diagram illustrating a configuration of a robot system according to a first embodiment.

FIG. 1 is a diagram illustrating a configuration of a robot system according to a first embodiment of the present invention. The robot system includes a robot 1 and a vision sensor 2. The robot 1 is installed in a working position on a production line in a state of being placed on a platform 3.

The robot 1 includes a main body 4, a plurality of arms 5, and a hand 6. The arms 5 and the hand 6 are coupled to each other. One of the arms 5 is coupled to the main body 4. The arms 5 and the hand 6 constitute a movable unit.

The arms 5 turn at the joint where they are coupled to each other. The movable unit picks up a workpiece and transports the picked-up workpiece. The movable unit moves the workpiece in the direction of three-axes (X, Y, and Z), which are perpendicular to each other, and rotates the workpiece about each axis.

The hand 6 is attached to the end on the hand side opposite to the side coupled to the main body 4 of the arms 5. The hand 6 holds a workpiece by adhering or grasping the workpiece. The robot 1 picks up the workpiece by operating the arms 5 and the hand 6 and moves the picked-up workpiece.

The vision sensor 2 is a sensor that measures the position in and the rotation angle about the XY directions, which are two dimensions, of the workpiece. The vision sensor 2 is attached to the side surface of the platform 3 such that it faces upward, so that its position relative to the main body 4 is fixed.

Figure 2:
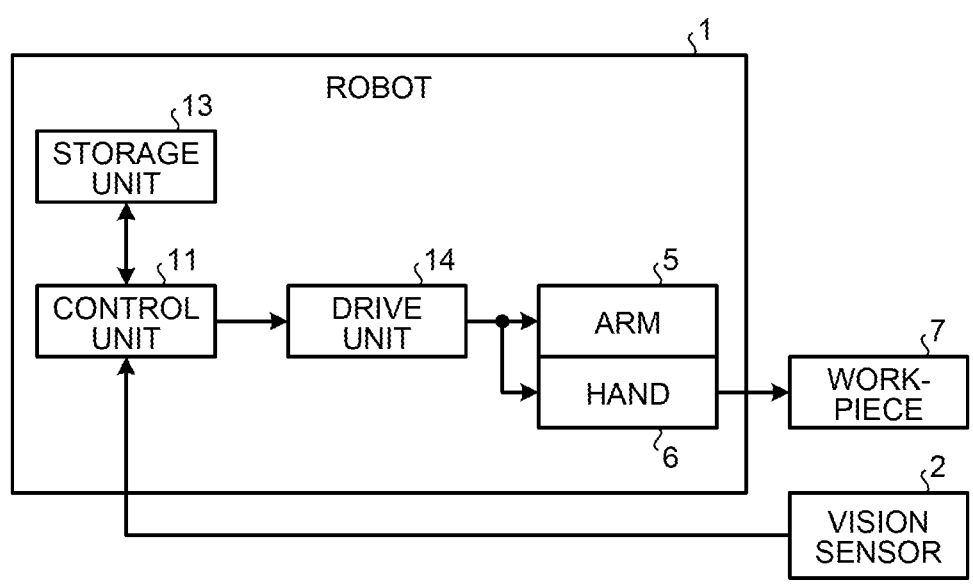
FIG. 2 is a diagram illustrating a block configuration of the robot system illustrated in FIG. 1.

FIG. 2 is a diagram illustrating a block configuration of the robot system illustrated in FIG. 1. The robot 1 includes a control unit 11, a storage unit 13, and a drive unit 14.

The control unit 11 controls the overall movement of the robot 1. The control unit 11 performs various types of arithmetic processing. The storage unit 13 stores therein various types of data. The drive unit 14 drives the arms 5 and the hand 6 under the control of the control unit 11. The vision sensor 2 measures the position in and the rotation angle about the XY directions of a workpiece 7 picked up by the arms 5 and the hand 6. The vision sensor 2 transmits the measurement results of the position and the rotation angle of the workpiece 7 to the control unit 11.

Figure 3:
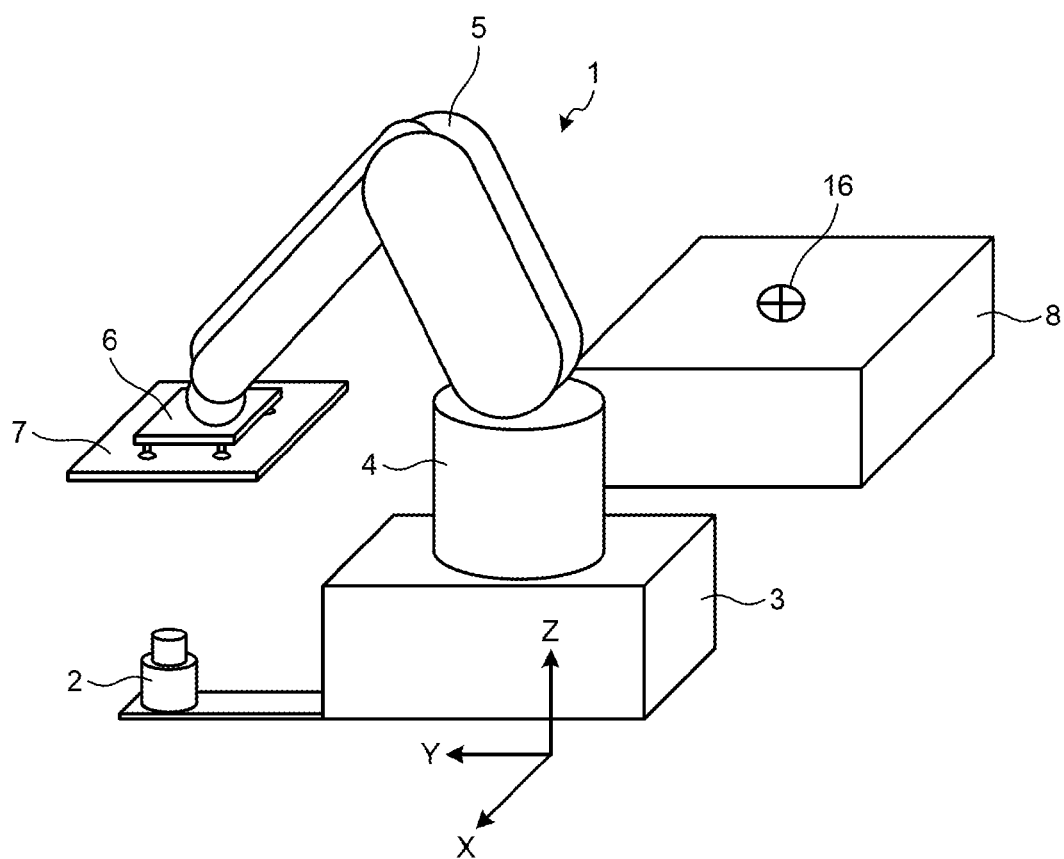
FIG. 3 is a perspective view schematically illustrating a state where a sensor of the robot system according to the first embodiment is measuring the position of a workpiece in advance preparation, which is a first process.
Figure 4:
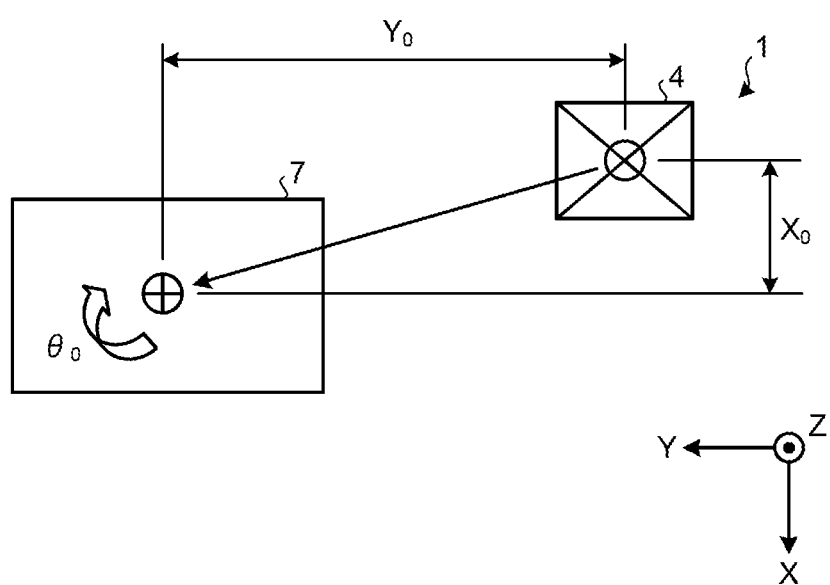
FIG. 4 is a plan view illustrating the positional relation between a main body and a workpiece illustrated in FIG. 3.
Figure 5:
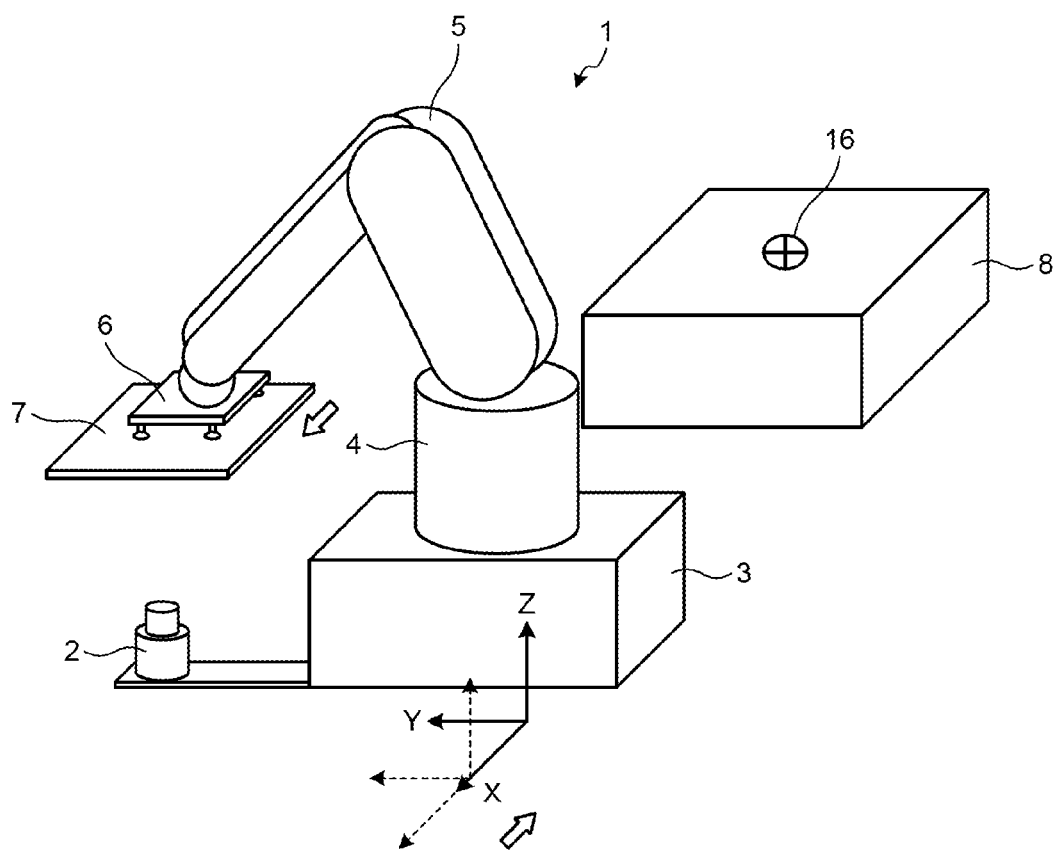
FIG. 5 is a perspective view schematically illustrating a state where the sensor of the robot system according to the first embodiment is detecting the position of a workpiece in a second process after a robot has been reinstalled in the working position.
Figure 6:
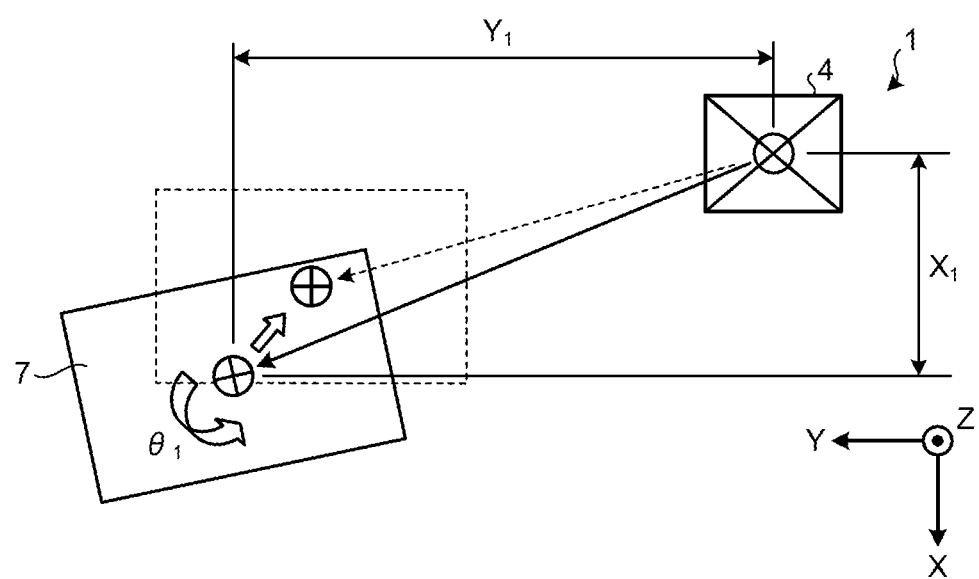
FIG. 6 is a plan view illustrating the positional relation between a main body and a workpiece illustrated in FIG. 5.

FIG. 3 is a perspective view schematically illustrating the robot system in a state where the sensor is measuring the position of a workpiece in advance preparation, which is a first process. FIG. 4 is a plan view illustrating the positional relation between the main body and the workpiece illustrated in FIG. 3. FIG. 5 is a perspective view schematically illustrating the robot system in a state where the sensor is detecting the position of a workpiece in a second process after the robot has been reinstalled in a working position. FIG. 6 is a plan view illustrating the positional relation between the main body and the workpiece illustrated in FIG. 5. FIGS. 7 to 11 are perspective views illustrating the robot system and a conveyor belt. The X axis, Y axis, and Z axis are reference axes with respect to the main body 4.

Figure 7:
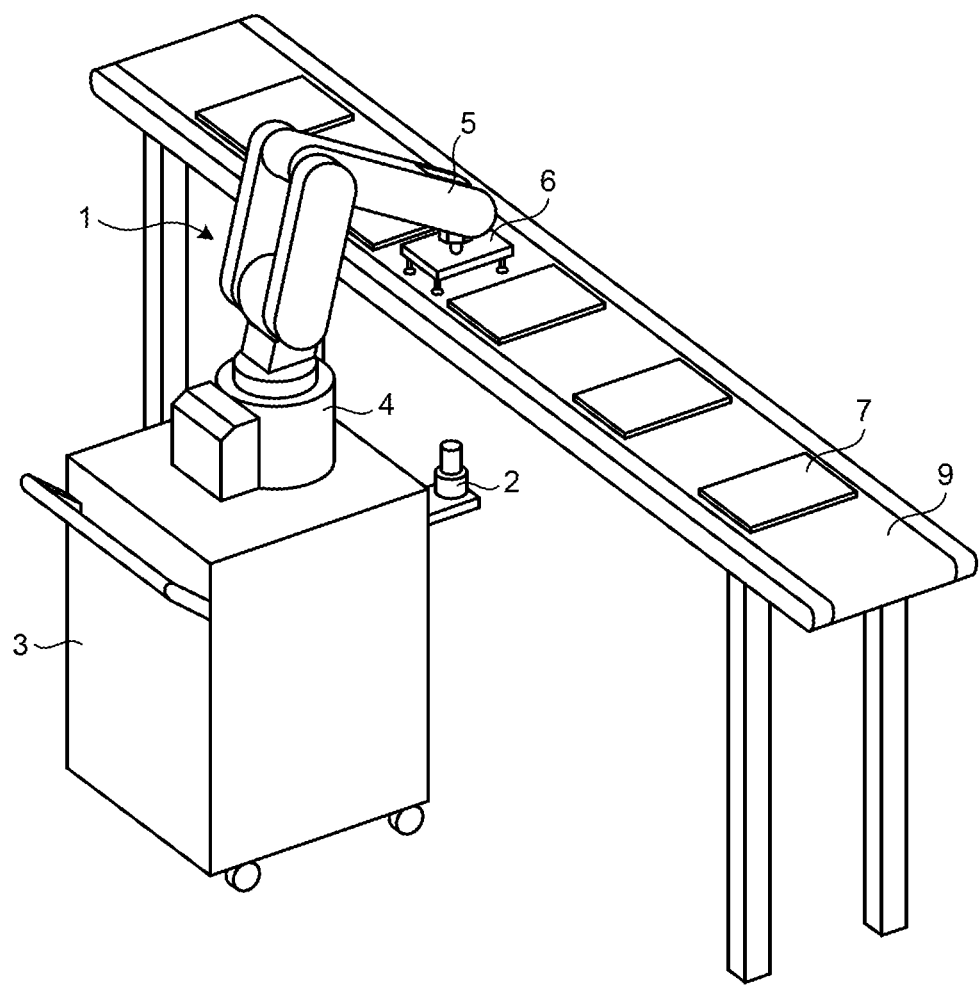
FIG. 7 is a perspective view illustrating the robot system according to the first embodiment and a conveyor belt.

In FIG. 7, a conveyor belt 9 constitutes a transport route of the workpiece 7 along a production line. As illustrated in FIG. 7, the conveyor belt 9 transports the workpiece 7 placed on the belt. The robot 1 is installed in the working position facing the conveyor belt 9 in a state of being placed on the platform 3.

Figure 8:
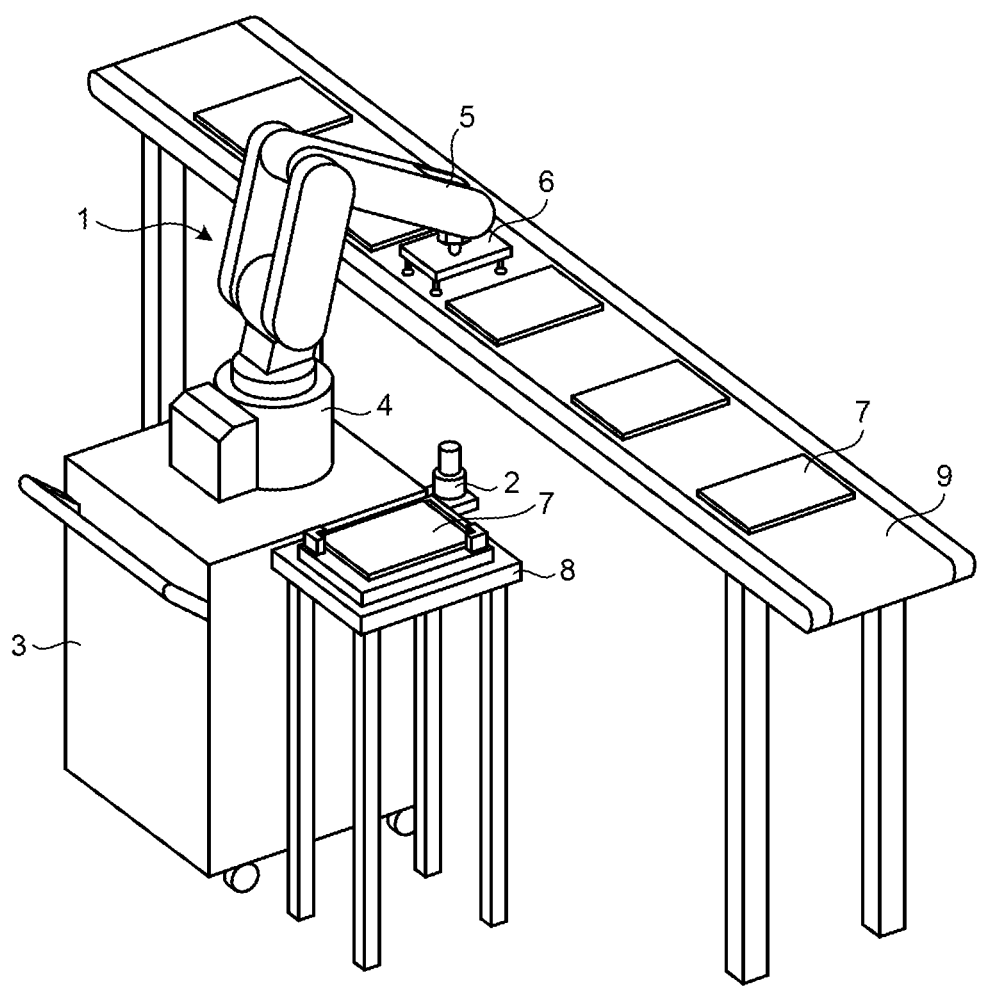
FIG. 8 is a perspective view illustrating the robot system according to the first embodiment, the conveyor belt, and a stage.

As illustrated in FIG. 8, a stage 8 is installed in the workplace of the robot 1 in addition to the platform 3. The robot 1 picks up the workpiece 7 placed on the stage 8 and moves the workpiece 7 from the stage 8 onto the conveyor belt 9.

The workpiece 7 is placed on the stage 8 and centered on a position 16 illustrated in FIG. 3. A robot operator sets the position 16, which is the teaching position for teaching the robot 1 the transport route of the workpiece 7, in the robot 1 in a teaching operation. The position 16 is set using XY coordinates with respect to the main body 4.

The robot 1 stores the coordinates of the position 16, which is the teaching position, in the storage unit 13. The teaching position is the central position of the hand 6 when it picks up the workpiece 7 from the stage 8 and a position that is the start of the transport route of the workpiece 7 from the stage 8 to the conveyor belt 9.

After the robot 1 has been installed in the working position, the robot 1 performs the advance preparation. In the advance preparation, the robot 1 acquires reference position data representing the positional relation between the main body 4 and the workpiece 7 picked up by the movable unit. In the first embodiment, the reference position data is also referred to as "reference workpiece position data" as appropriate.

Figure 12:
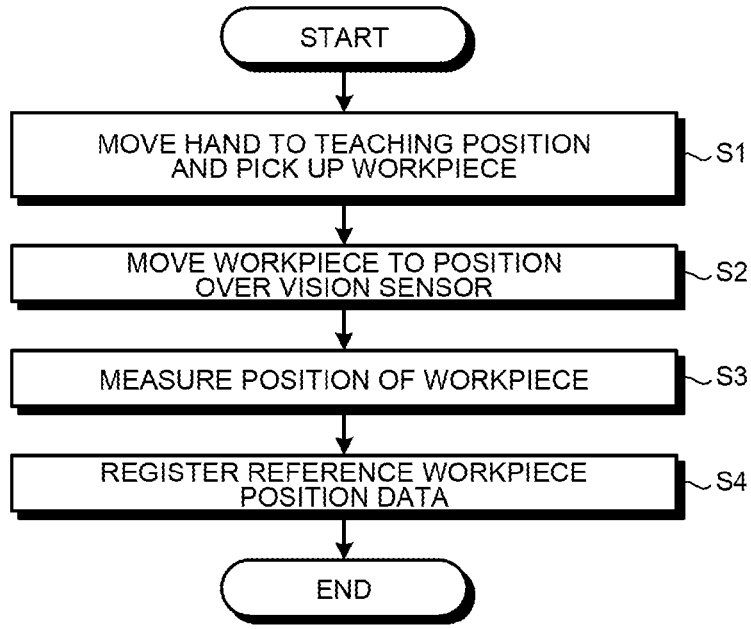
FIG. 12 is a flowchart illustrating an operation procedure of the robot system according to the first embodiment in the first process, which is advance preparation.

FIG. 12 is a flowchart illustrating an operation procedure of the robot system in the first process, which is the advance preparation. The workpiece 7 is placed on the stage 8 in a state of being accurately positioned. At this point in time, the center of the workpiece 7 matches the position 16, and the workpiece 7 is placed with the rotation angle set beforehand with respect to the X axis and the Y axis.

Figure 9:
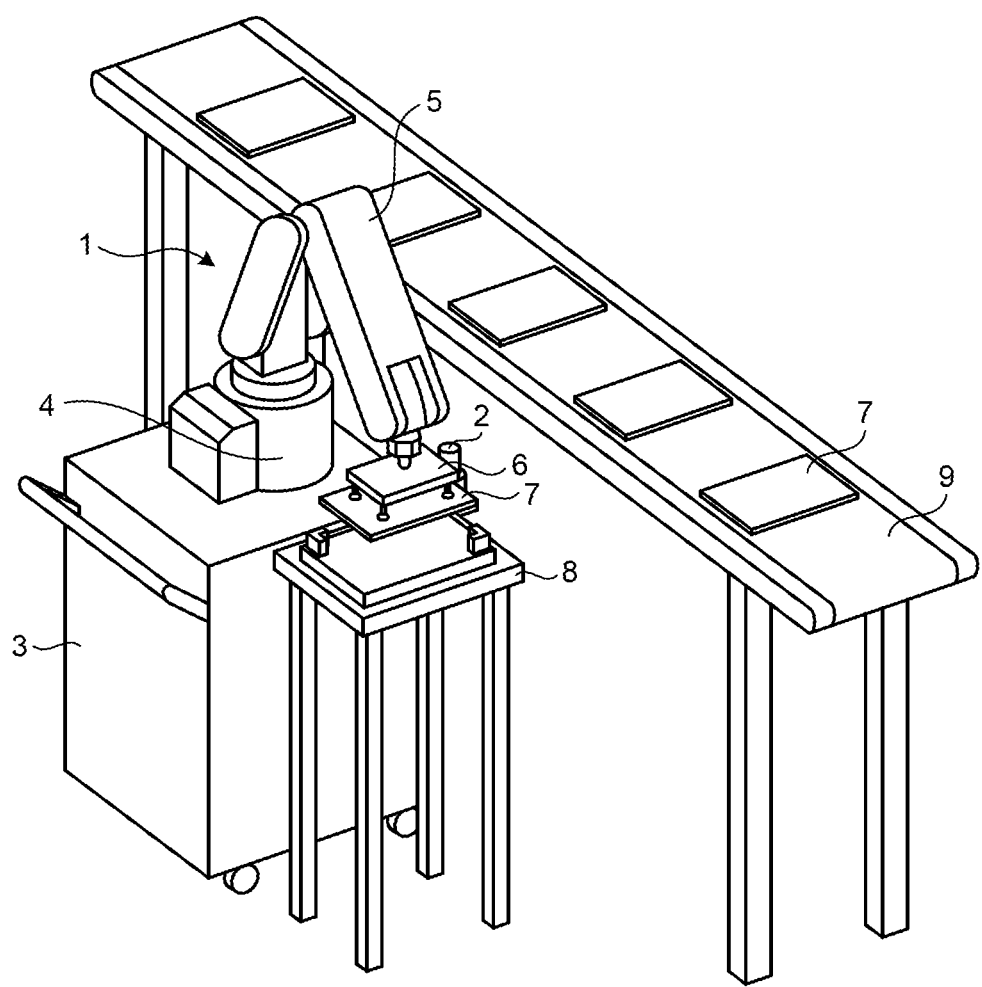
FIG. 9 is a perspective view illustrating a state where the robot system according to the first embodiment is picking up a workpiece from the stage.

In the advance preparation, the control unit 11 controls the movement of the arms 5 and the hand 6 with the amount of control registered beforehand in the storage unit 13. By moving the arms 5 and the hand 6 under the control of the control unit 11, the robot 1 moves the hand 6 to the teaching position registered in the storage unit 13 and picks up the workpiece 7 from the stage 8 as illustrated in FIG. 9 (Step S1). The teaching position registered in the storage unit 13 matches the position 16. The central position of the hand 6 holding the workpiece 7 matches the central position of the workpiece 7.

Figure 10:
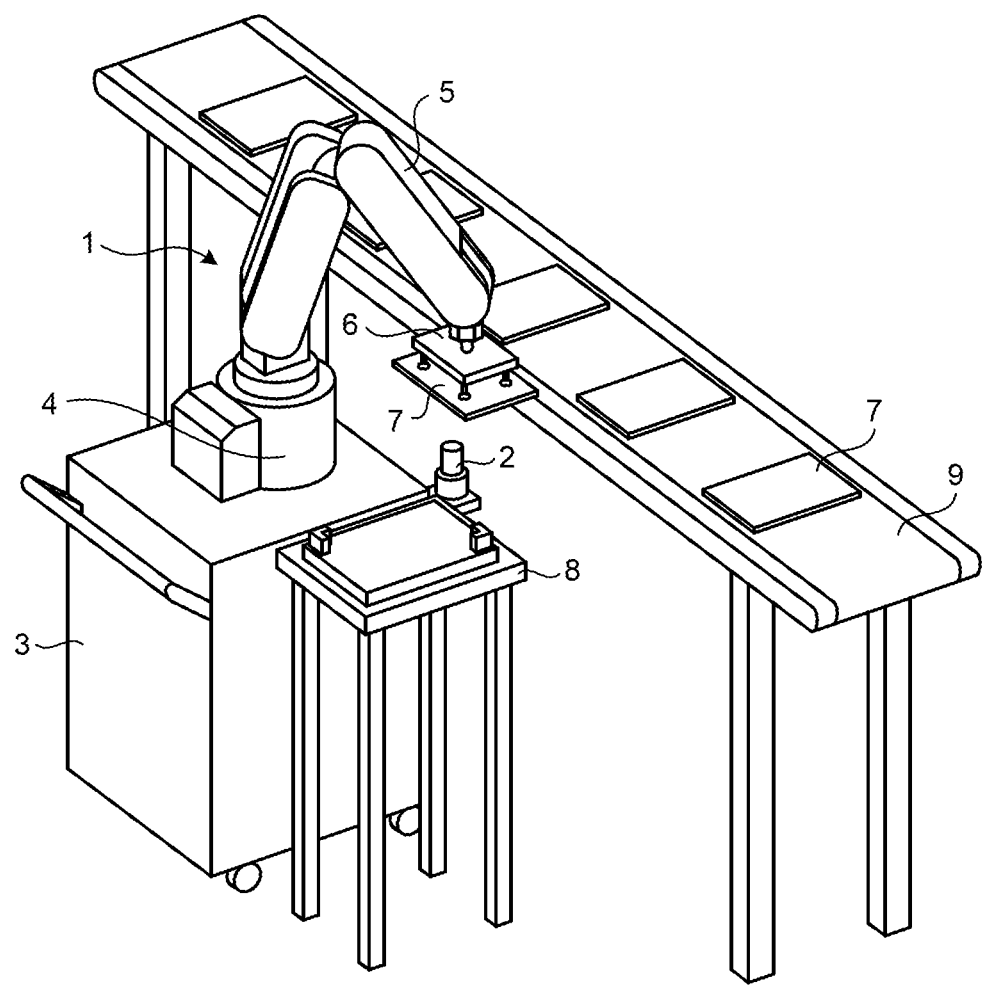
FIG. 10 is a perspective view illustrating a state where the robot system according to the first embodiment has moved a workpiece to a position over a vision sensor.

When the workpiece 7 is picked up from the stage 8, the robot 1 moves the picked-up workpiece 7 to the position over the vision sensor 2 (Step S2). FIG. 3 and FIG. 10 illustrate the robot 1 when the workpiece 7 has been moved to the position over the vision sensor 2.

When the workpiece 7 is moved to the position over the vision sensor 2, the vision sensor 2 measures the position of the workpiece 7 over the vision sensor 2 by taking a picture of the workpiece 7 (Step S3). The vision sensor 2 outputs the result of the measurement of the position of the workpiece 7 to the control unit 11.

The control unit 11 obtains respective values of $X_0$, $Y_0$, and $\theta_0$ illustrated in FIG. 4 on the basis of the result input from the vision sensor 2. $X_0$, $Y_0$, and $\theta_0$ are workpiece position data in the XY directions. $X_0$ is the distance in the X direction between the main body 4 and the workpiece 7. $Y_0$ is the distance in the Y direction between the main body 4 and the workpiece 7. The distance between the main body 4 and the workpiece 7 is the distance between the central position of the main body 4 in the XY directions and the central position of the workpiece 7 in the XY directions. $\theta_0$ is the rotation angle of the workpiece 7 in the XY plane. The rotation angle of the workpiece 7 is an angle with respect to the X axis and the Y axis and represents the inclination of the workpiece 7 in the XY coordinate system.

The workpiece position data ($X_0$, $Y_0$, and $\theta_0$) represents the position of the workpiece 7 over the vision sensor 2 and is reference workpiece position data representing the relation between the position of the main body 4 and the position of the workpiece 7. The control unit 11 registers the reference workpiece position data ($X_0$, $Y_0$, and $\theta_0$) in the storage unit 13 (Step S4). Then, the robot system ends the advance preparation.

When there are a plurality of stages 8 from which the robot 1 picks up the workpiece 7, the robot system registers the reference workpiece position data for a pickup movement of the workpiece 7 from each stage 8 in the advance preparation. After the advance preparation, the robot 1 operates in the state where the robot 1 remains installed in the working position when the advance preparation was performed.

Figure 11:
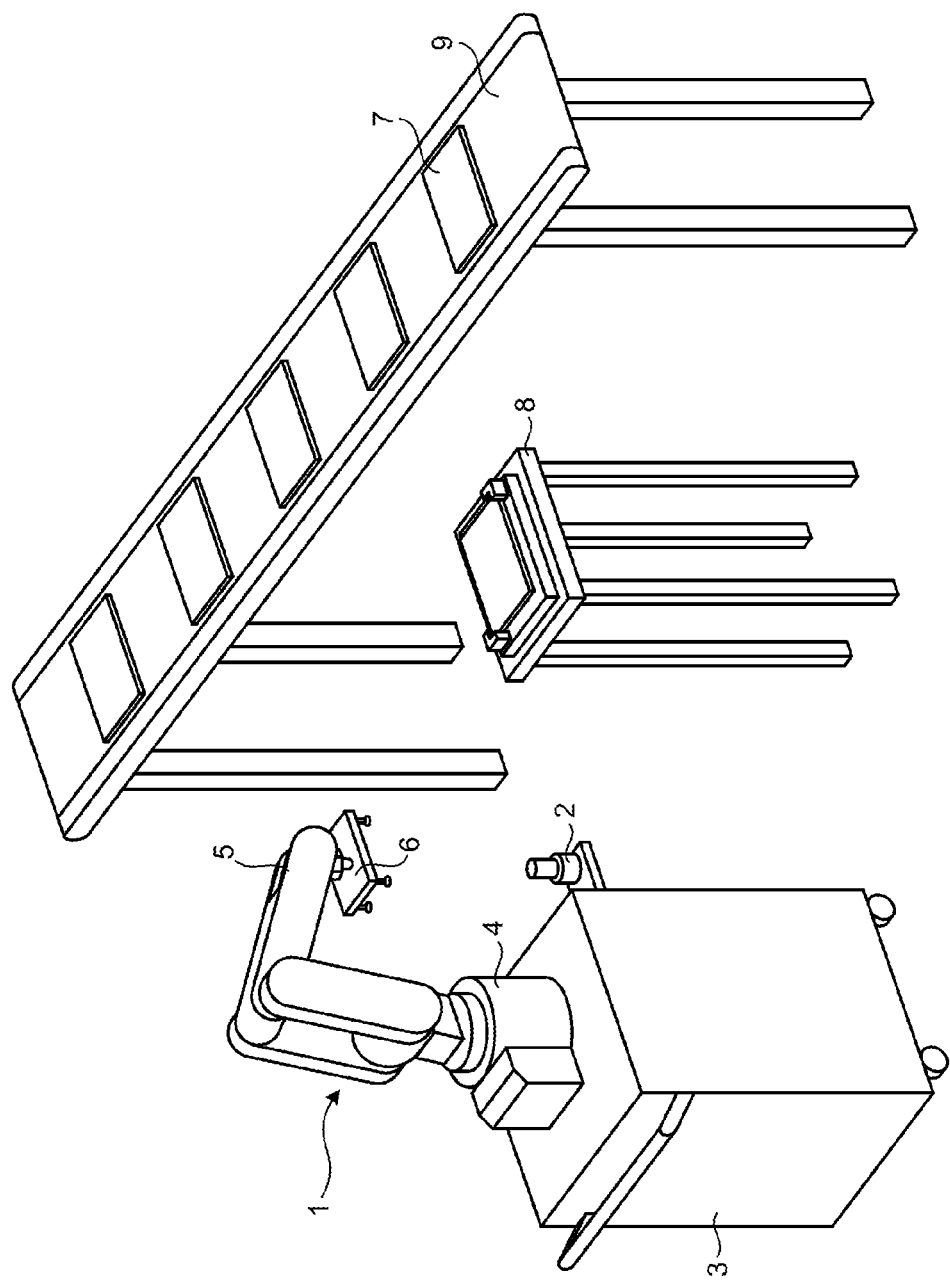
FIG. 11 is a perspective view illustrating a state where the robot has been moved from a working position in the robot system according to the first embodiment.

After the operation of the robot 1 has been started, the robot operator sometimes temporarily stops the operation of the robot 1 for repair or maintenance of the robot 1 and moves the robot 1 to the outside of the area where the production line is provided. In this case, the robot operator moves the robot 1 with the intention of reinstalling it at its original working position after it has undergone repair or maintenance. Even when the robot 1 is moved temporarily from the working position where the robot 1 has been installed together with the platform 3 as illustrated in FIG. 11, the positional relation between the main body 4 placed on the platform 3 and the vision sensor 2 fixed to the platform 3 does not change.

When the robot 1 is to be reinstalled, even if the robot operator returns the robot 1 to the original working position on the basis of a mark, a certain amount of change in the positional relation between the transport route of the workpiece 7 and the robot 1 is caused with respect to the original positional relation. Therefore, the positional relation between the workpiece 7 positioned on the stage 8 and the main body 4 has changed from the state at the time of the advance preparation. It is assumed that the stage 8 is left in the same position as that in the advance preparation.

If the robot 1 is reinstalled, the robot system according to the first embodiment corrects the teaching position on the basis of the difference between the reference workpiece position data registered in the advance preparation and the position data acquired after reinstallation. In the first embodiment, the position data acquired after reinstallation is also referred to as "workpiece position data" where appropriate.

Figure 13:
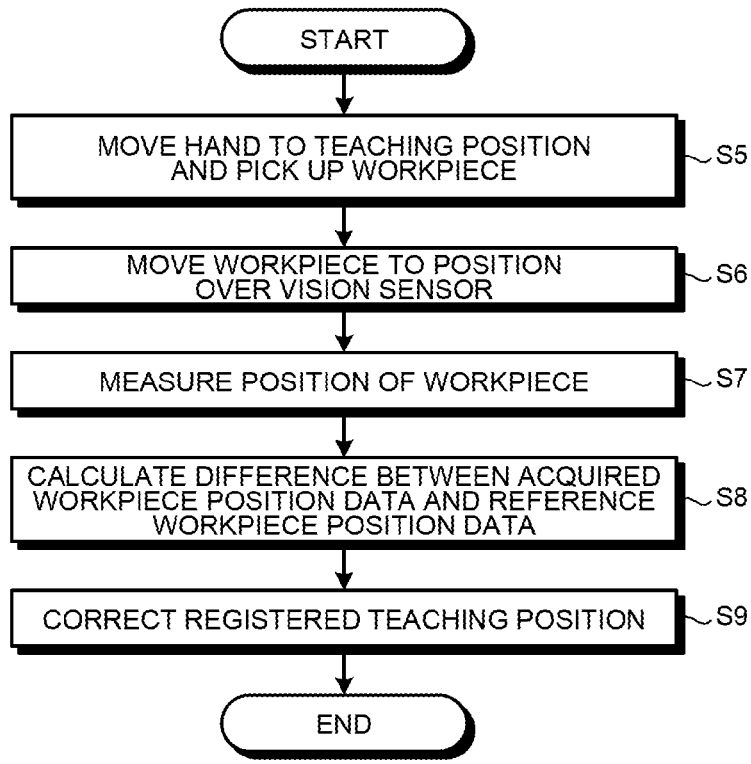
FIG. 13 is a flowchart illustrating an operation procedure of the robot system according to the first embodiment in a second process after reinstallation of the robot.

FIG. 13 is a flowchart illustrating an operation procedure of the robot system in the second process after reinstallation of the robot. After the robot operator has reinstalled the robot 1 at the original working position, the control unit 11 controls the movement of the arms 5 and the hand 6 with the amount of control registered beforehand in the storage unit 13. By moving the arms 5 and the hand 6 under the control of the control unit 11, the robot 1 moves the hand 6 to the reference position registered in the storage unit 13 to pick up the workpiece 7 from the stage 8 (Step S5).

Because the position of the main body 4 has changed relative to the workpiece 7 placed on the stage 8, the central position 16 of the workpiece 7 deviates from the teaching position registered in the storage unit 13. Therefore, the central position of the hand 6 holding the workpiece 7 deviates from the central position of the workpiece 7.

When the workpiece 7 is picked up from the stage 8, the robot 1 moves the picked-up workpiece 7 to the position over the vision sensor 2 (Step S6). FIG. 5 illustrates the robot 1 when the workpiece 7 has been moved to the position over the vision sensor 2.

When the workpiece 7 is moved to the position over the vision sensor 2, the vision sensor 2 takes a picture of the workpiece 7 to measure the position of the workpiece 7 relative to the main body 4 (Step S7). The vision sensor 2 outputs the result of the measurement of the position of the workpiece 7 to the control unit 11.

The control unit 11 obtains respective values of $X_1$, $Y_1$, and $\theta_1$ illustrated in FIG. 6 on the basis of the result input from the vision sensor 2. $X_1$, $Y_1$, and $\theta_1$ are workpiece position data in the XY directions. $X_1$ is the distance in the X direction between the main body 4 and the workpiece 7. $Y_1$ is the distance in the Y direction between the main body 4 and the workpiece 7. $\theta_1$ is the rotation angle of the workpiece 7 in the XY plane.

Accordingly, the control unit 11 obtains the workpiece position data ($X_1$, $Y_1$, and $\theta_1$) after the robot 1 has been reinstalled. The workpiece position data ($X_1$, $Y_1$, and $\theta_1$) represents the position of the workpiece 7 over the vision sensor 2.

The control unit 11 reads the reference workpiece position data ($X_0$, $Y_0$, and $\theta_0$) registered at Step S4 from the storage unit 13. The control unit 11 calculates the difference ($\Delta X$, $\Delta Y$, and $\Delta\theta$) between the workpiece position data ($X_1$, $Y_1$, and $\theta_1$) acquired after the robot 1 has been reinstalled and the reference workpiece position data ($X_0$, $Y_0$, and $\theta_0$) (Step S8). $\Delta X$, $\Delta Y$, and $\Delta\theta$ are obtained by calculating $\Delta X=X_1-X_0$, $\Delta Y=Y_1-Y_0$, and $\Delta\theta=\theta_1-\theta_0$.

The difference ($\Delta X$, $\Delta Y$, and $\Delta\theta$) obtained at Step S8 corresponds to the amount of change of the position of the robot 1 relative to the workpiece 7 positioned on the stage 8. That is, the difference ($\Delta X$, $\Delta Y$, and $\Delta\theta$) represents the amount of deviation between the position where the robot 1 is installed in the advance preparation and the position where the robot 1 is reinstalled. The control unit 11 registers the difference calculated at Step S8 in the storage unit 13.

After the difference has been registered in the storage unit 13, the control unit 11 corrects the coordinates of the teaching position on the basis of the difference read from the storage unit 13 in the movement of picking up the workpiece 7 from the stage 8. At Step S9, the control unit 11 corrects the teaching position registered in the storage unit 13 and controls the movement of the arms 5 and the hand 6. When the teaching position that is a position other than the position at which the workpiece 7 is picked up and is a position along the transport route of the workpiece 7 has been registered in the storage unit 13, the control unit 11 can correct each of the registered teaching positions on the basis of the difference.

After the operation of the robot 1 has been started, the robot operator sometimes temporarily stops the operation of the robot 1 and relocates the robot 1 in order to switch the production line on which the robot 1 is operated. Further, the robot operator sometimes relocates the robot 1 in order to cause the robot 1 to do a work that has been performed by an operator on the production line.

Even if the robot 1 has been relocated, the robot system according to the first embodiment corrects the teaching position on the basis of the difference between the reference workpiece position data registered in the advance preparation and the position data acquired after the robot has been relocated. Even if the robot 1 has been relocated, the robot system operates according to the procedures illustrated at Step S5 to Step S9.

If there are a plurality of stages 8 from which the robot 1 picks up the workpiece 7, the robot system obtains the difference for a pickup movement of the workpiece 7 from each stage 8. Accordingly, the robot system corrects the teaching position that is a position where the workpiece 7 is picked up on the basis of the difference.

According to the first embodiment, the robot system corrects the teaching position that is the position where the workpiece 7 is picked up with respect to the XY directions. When the robot 1 is reinstalled or relocated, the robot system corrects the teaching position instead of the teaching operation for teaching the robot 1 the transport route.

Accordingly, the robot operator does not need to perform the teaching operation when the robot 1 is reinstalled and when the robot 1 is relocated, and can correct the teaching position registered in the robot 1 with less laborious work regardless of the operator's skill in handling the robot 1.

The robot system automatically performs each operation in the advance preparation after the robot 1 has been installed in the working position and each operation after the robot 1 has been reinstalled or relocated by executing a program. By executing the program, the robot system can automatically perform the series of operations performed for correction of the teaching position along the transport route of the workpiece 7.

Figure 14:
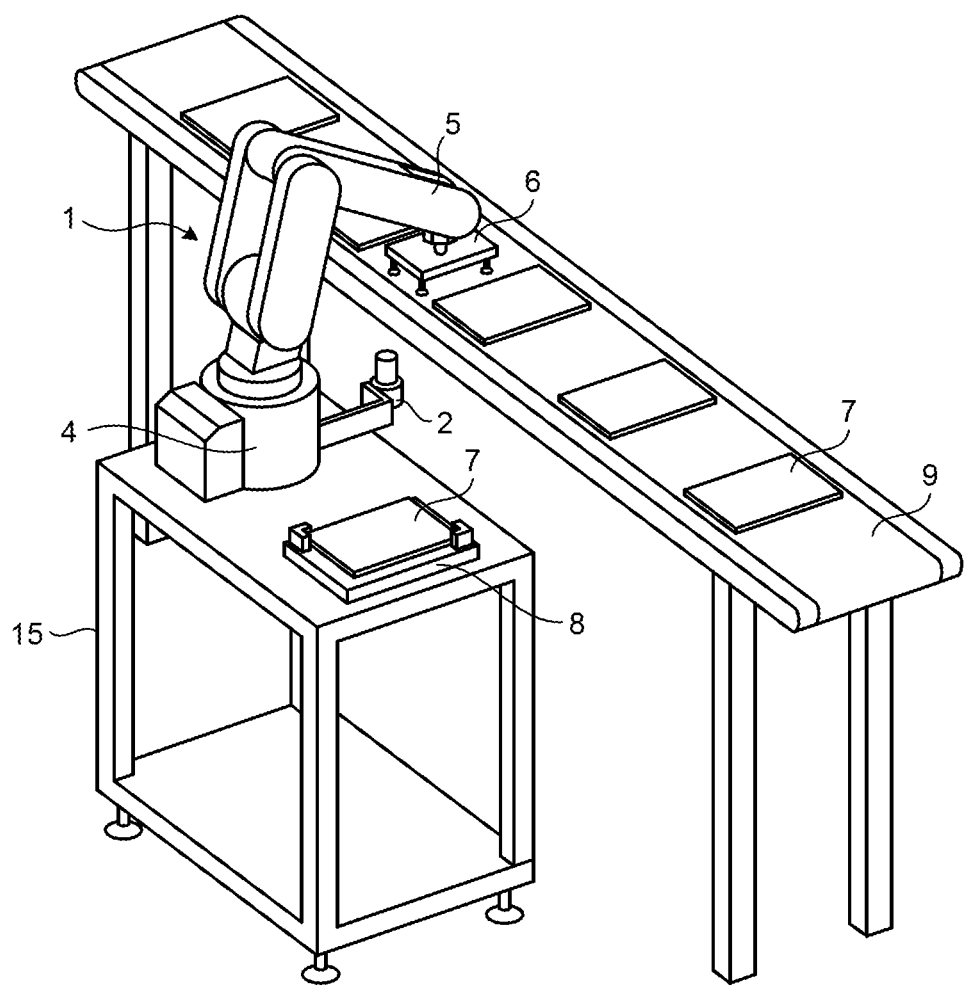
FIG. 14 is a perspective view illustrating a configuration of a robot system according to a modification of the first embodiment.

FIG. 14 is a perspective view illustrating a configuration of a robot system according to a modification of the first embodiment. The robot 1 is placed at the working position on a platform 15 installed on the production line. The vision sensor 2 is attached to the side surface of the main body 4 such that it faces upward, so that its position relative to the main body 4 is fixed.

The stage 8 is placed on the platform 15. The robot 1 picks up the workpiece 7 placed on the stage 8 to move the workpiece 7 from the stage 8 to the conveyor belt 9.

After the robot 1 has been installed in the working position on the platform 15, the robot 1 performs the advance preparation. In the advance preparation, the robot 1 acquires the reference workpiece position data representing the positional relation between the main body 4 and the workpiece 7 picked up by the movable unit.

In the present modification, the robot system also performs the advance preparation according to the procedure illustrated in FIG. 12. After the operation of the robot 1 has been started, the robot operator sometimes temporarily stops the operation of the robot 1 for repair or maintenance of the robot 1 and moves the robot 1 from the platform 15. In this case, the robot operator moves the robot 1 with the intention of reinstalling it at its original working position after it has undergone repair or maintenance.

Figure 15:
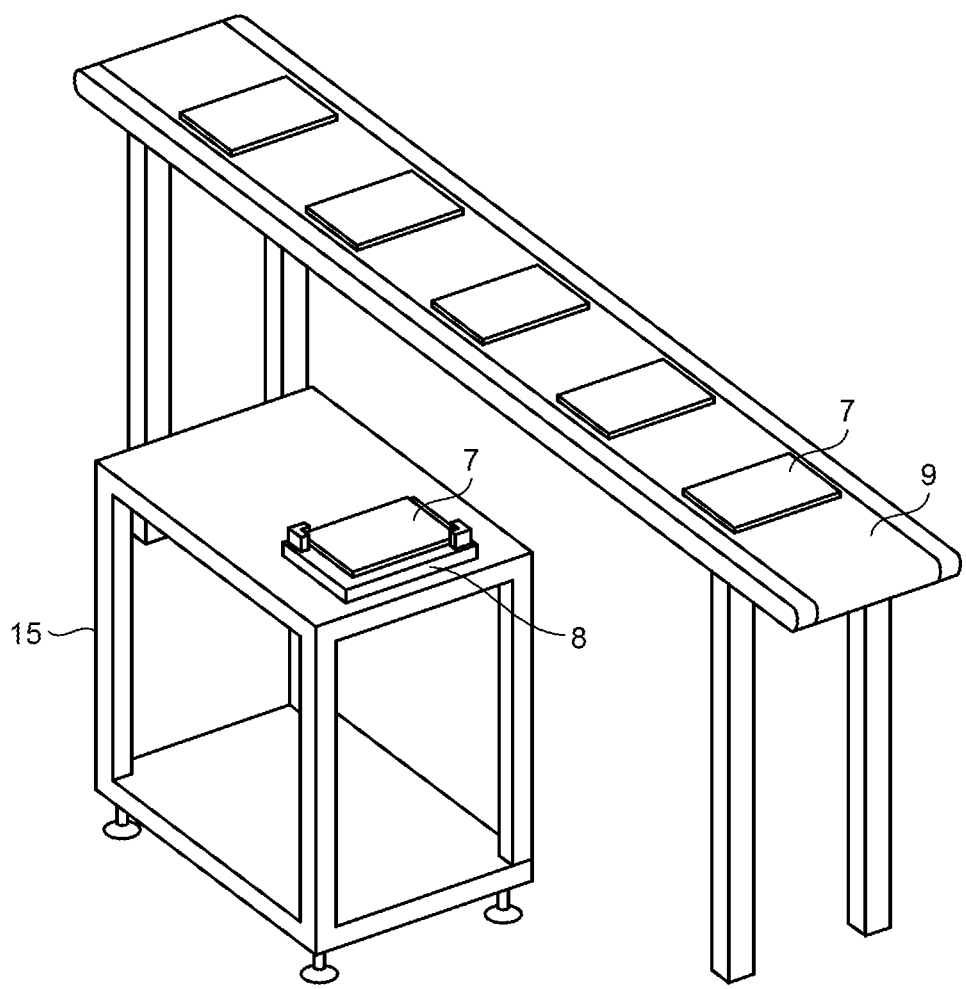
FIG. 15 is a perspective view illustrating a state where the robot has been removed from a platform in the robot system according to the modification of the first embodiment.

FIG. 15 illustrates a state after the robot 1 has been removed from the platform 15 in the robot system illustrated in FIG. 14. It is assumed that even after the robot 1 has been moved from the platform 15, the vision sensor 2 is still fixed to the main body 4. Accordingly, even when the robot 1 is moved, the positional relation between the main body 4 and the vision sensor 2 does not change.

When the robot 1 is to be reinstalled on the platform 15, even if the robot operator returns the robot 1 to the original working position on the basis of a mark, a certain amount of change in the positional relation between the transport route of the workpiece 7 and the robot 1 is caused with respect to the original state. Therefore, the positional relation between the workpiece 7 positioned on the stage 8 and the main body 4 has changed from the state at the time of the advance preparation. It is assumed that the stage 8 is left in the same position as that in the advance preparation.

In the present modification, the robot system also registers the difference between the reference workpiece position data registered in the advance preparation and the position data acquired after reinstallation in the storage unit 13 according to the procedure illustrated in FIG. 13. In the movement of picking up the workpiece 7 from the stage 8, the control unit 11 corrects the coordinates of the teaching position on the basis of the difference read from the storage unit 13. The control unit 11 corrects the teaching position registered in the storage unit 13 and controls the movement of the arms 5 and the hand 6. Also in the present modification, when the robot 1 is to be relocated from the position where the robot 1 has been installed to another working position, the robot system performs the operation in the procedure illustrated in FIG. 13.

Also in the present modification, the robot operator does not need to perform the teaching operation when the robot 1 is reinstalled and when the robot 1 is relocated and can correct the teaching position registered in the robot with less laborious work regardless of the operator's robot-handling skill.

Second Embodiment

Figure 16:
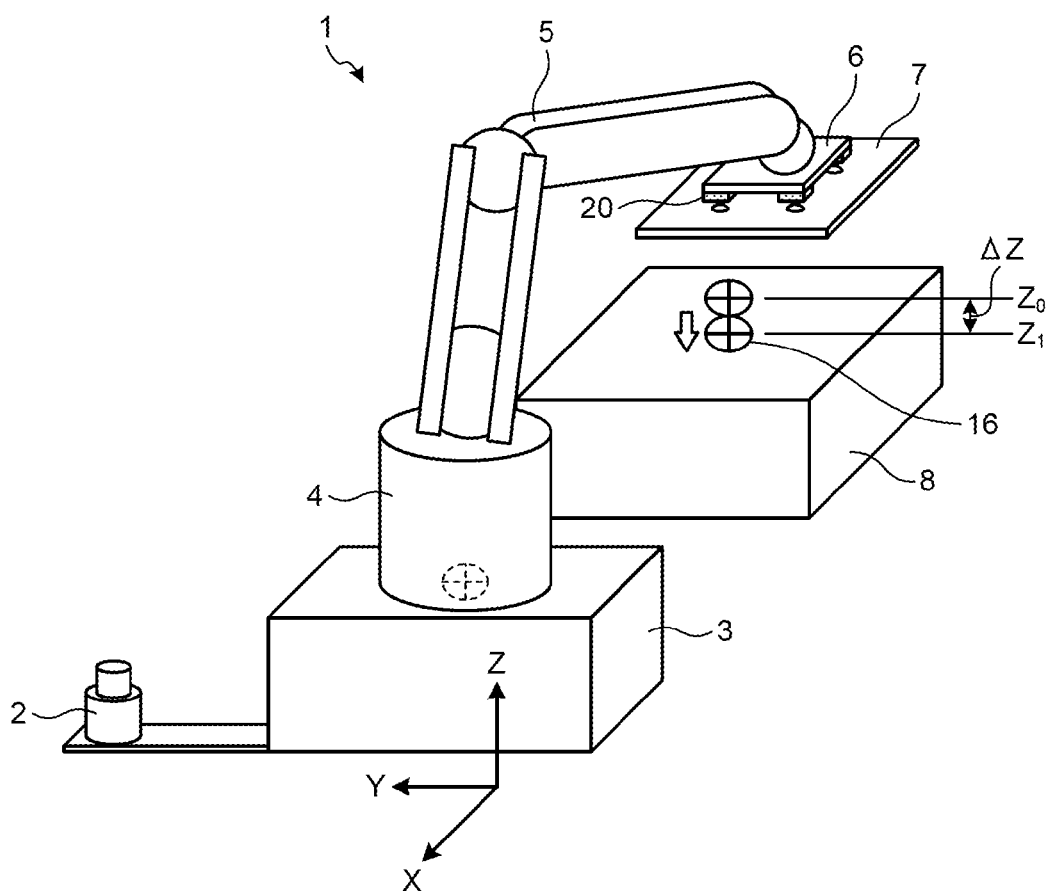
FIG. 16 is a perspective view schematically illustrating a robot system according to a second embodiment.

FIG. 16 is a perspective view schematically illustrating a robot system according to a second embodiment of the present invention. Components identical to those of the first embodiment are denoted by like reference signs and redundant descriptions thereof will be omitted as appropriate. The X axis, Y axis, and Z axis are reference axes with respect to the main body 4.

The robot 1 includes the main body 4, the arms 5, the hand 6, and a contact sensor 20. The contact sensor 20 detects the presence of contact between the hand 6 and the workpiece 7.

When the contact sensor 20 detects contact between the hand 6 and the workpiece 7, the control unit 11 obtains the position of the workpiece 7 in the Z direction. The contact sensor 20 is a sensor that measures the position of the workpiece 7 in the Z direction. The control unit 11 imports the position of the hand 6 at the time when the hand 6 comes into with the workpiece 7 in order to obtain the position of the workpiece 7 in the Z direction.

The workpiece 7 is placed on the stage 8 and centered on the position 16. A robot operator sets the position 16, which is the teaching position for teaching the robot 1 the transport route of the workpiece 7, in the robot 1 in a teaching operation. The position 16 is set using XYZ coordinates with respect to the main body 4.

The robot 1 stores the coordinates of the position 16, which is the teaching position, in the storage unit 13. The teaching position is the central position of the hand 6 when it picks up the workpiece 7 from the stage 8 and a position that is the start of the transport route of the workpiece 7 from the stage 8 to the conveyor belt 9.

After the robot 1 has been installed in the working position, the robot 1 performs the advance preparation. In the advance preparation, the robot 1 acquires reference position data representing the positional relation between the main body 4 and the workpiece 7 picked up by the movable unit. In the second embodiment, the reference position data is also referred to as "reference workpiece position data" where appropriate.

In the advance preparation, the control unit 11 controls the movement of the arms 5 and the hand 6 with the amount of control registered beforehand in the storage unit 13. By moving the arms 5 and the hand 6 under the control of the control unit 11, the robot 1 moves the hand 6 to the teaching position registered in the storage unit 13 and picks up the workpiece 7 from the stage 8.

The contact sensor 20 detects contact between the hand 6 and the workpiece 7, thereby measuring the position of the workpiece 7 on the stage 8. The contact sensor 20 outputs the measurement result of the position of the workpiece 7 to the control unit 11. The control unit 11 obtains a value of $Z_0$ illustrated in FIG. 16 on the basis of the result input from the contact sensor 20. $Z_0$ is workpiece position data in the Z direction and represents the height of the workpiece 7 with respect to the main body 4.

The height of the workpiece 7 with respect to the main body 4 means the height from the surface of the platform 3 on which the main body 4 is placed to the surface of the stage 8 on which the workpiece 7 is placed. The control unit 11 registers the workpiece position data $(Z_0)$, which is the reference workpiece position data with respect to the Z direction, in the storage unit 13. The reference workpiece position data $(Z_0)$ represents the position of the workpiece 7 on the stage 8.

When the workpiece 7 is picked up from the stage 8, as in the first embodiment, the robot 1 moves the picked-up workpiece 7 to the position over the vision sensor 2. The vision sensor 2 measures the position of the workpiece 7 over the vision sensor 2. The control unit 11 registers the workpiece position data $(X_0, Y_0, $ and $\theta_0)$, which is the reference workpiece position data with respect to the XY directions, in the storage unit 13.

When the robot 1 is reinstalled, the robot system according to the second embodiment corrects the teaching position on the basis of the difference between the reference workpiece position data registered in the advance preparation and the position data acquired after reinstallation. In the second embodiment, the position data acquired after reinstallation is also referred to as "workpiece position data" where appropriate.

In the operation procedure of the robot system after the robot 1 has been reinstalled or relocated, the control unit 11 controls the movement of the arms 5 and the hand 6 with the amount of control registered beforehand in the storage unit 13. By moving the arms 5 and the hand 6 under the control of the control unit 11, the robot 1 moves the hand 6 to the teaching position registered in the storage unit 13 and picks up the workpiece 7 from the stage 8.

The contact sensor 20 detects contact between the hand 6 and the workpiece 7, thereby measuring the position of the workpiece 7 on the stage 8. The contact sensor 20 outputs the measurement result of the position of the workpiece 7 to the control unit 11. The control unit 11 obtains a value of $Z_1$ illustrated in FIG. 16 on the basis of the result input from the contact sensor 20. $Z_1$ is the workpiece position data in the Z direction and represents the height of the workpiece 7 with respect to the main body 4.

Accordingly, the control unit 11 obtains the workpiece position data $(Z_1)$ after reinstallation of the robot 1. The workpiece position data $(Z_1)$ represents the position of the workpiece 7 on the stage 8. The control unit 11 reads the workpiece position data $(Z_0)$ registered in the advance preparation from the storage unit 13. The control unit 11 calculates the difference $(\Delta Z)$ between the workpiece position data $(Z_1)$ acquired after the robot 1 has been reinstalled and the reference workpiece position data $(Z_0)$. $\Delta Z$ is obtained by calculating $\Delta Z = Z_1 - Z_0$.

When the workpiece 7 is picked up from the stage 8, as in the first embodiment, the robot 1 moves the picked-up workpiece 7 to the position over the vision sensor 2. The vision sensor 2 measures the position of the workpiece 7 over the vision sensor 2. The control unit 11 obtains the workpiece position data $(X_1, Y_1, Z_1$ and $\theta_1)$ after the robot 1 has been reinstalled.

As in the first embodiment, the control unit 11 calculates the difference $(\Delta X, \Delta Y, \Delta Z$ and $\Delta \theta)$ between the workpiece position data $(X_1, Y_1,$ and $\theta_1)$ acquired after the robot 1 has been reinstalled and the reference workpiece position data ($X_1$, $Y_1$, $Z_1$ and $\theta_1$) acquired after the robot 1 has been reinstalled and the reference workpiece position data ($X_0$, $Y_0$, $Z_0$, and $\theta_0$).

The difference ($\Delta X$, $\Delta Y$, $\Delta Z$, and $\Delta\theta$) corresponds to the amount of change of the position of the robot 1 relative to the workpiece 7 since the advance preparation. That is, the difference ($\Delta X$, $\Delta Y$, $\Delta Z$, and $\Delta\theta$) represents the amount of deviation between the position where the robot 1 is installed in the advance preparation and the position where the robot 1 is reinstalled. The control unit 11 registers the difference calculated for the Z direction and the XY directions in the storage unit 13.

After the difference has been registered in the storage unit 13, the control unit 11 corrects the coordinates of the teaching position on the basis of the difference read from the storage unit 13 in the movement of picking up the workpiece 7 from the stage 8. The control unit 11 corrects the teaching position registered in the storage unit 13 and controls the movement of the arms 5 and the hand 6. When the teaching position that is a position other than the position where the workpiece 7 is picked up and is a position along the transport route of the workpiece 7 has been registered in the storage unit 13, the control unit 11 can correct each of the registered teaching positions on the basis of the difference.

According to the second embodiment, the robot system corrects the teaching position that is the position where the workpiece 7 is picked up with respect to the XYZ directions. When the robot 1 is reinstalled or relocated, the robot system corrects the teaching position instead of the teaching operation for teaching the robot 1 the transport route.

Also in the second embodiment, as in the first embodiment, the robot operator does not need to perform the teaching operation when the robot 1 is reinstalled and when the robot 1 is relocated, and can correct the teaching position registered in the robot with less laborious work regardless of the operator's robot-handling skill.

The robot system is not limited to the robot system including the contact sensor 20. The sensor that measures the position of the workpiece 7 in the Z direction can be any sensor other than the contact sensor 20. The robot system can include a sensor that detects that the workpiece 7 is held by the hand 6 instead of the contact sensor 20.

Third Embodiment

Figure 17:
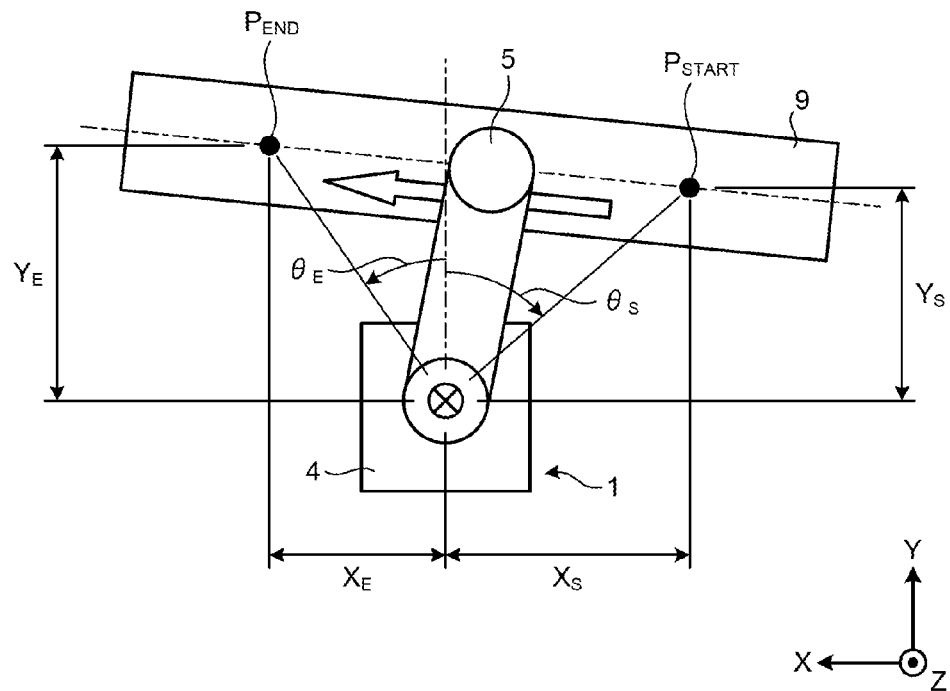
FIG. 17 is a schematic view illustrating an upper surface configuration of a robot system according to a third embodiment.
Figure 18:
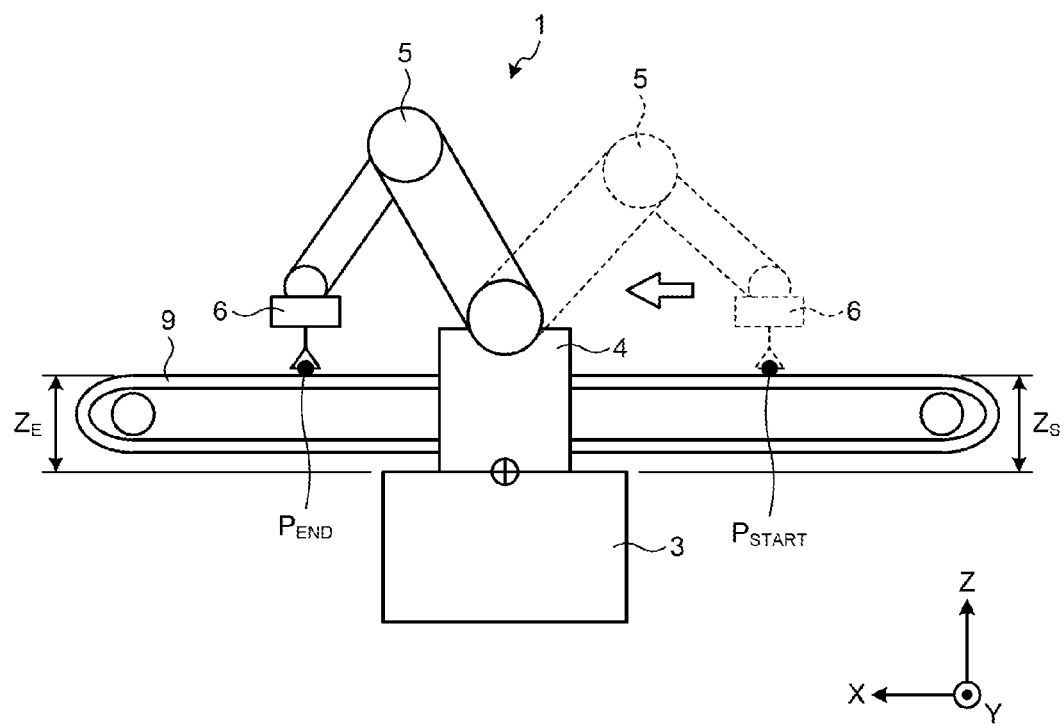
FIG. 18 is a schematic view illustrating a side surface configuration of the robot system illustrated in FIG. 17.

FIG. 17 is a schematic view illustrating an upper surface configuration of a robot system according to a third embodiment of the present invention. FIG. 18 is a schematic view illustrating a side surface configuration of the robot system illustrated in FIG. 17. Components identical to those of the first embodiment are denoted by like reference signs and redundant descriptions thereof will be omitted as appropriate. The X axis, Y axis, and Z axis are reference axes with respect to the main body 4.

The robot 1 is installed in a working position on a production line in a state of being placed on the platform 3. The robot 1 includes the main body 4, the arms 5, the hand 6, the control unit 11, the storage unit 13, and the drive unit 14.

The conveyor belt 9 constitutes a transport route of the workpiece 7 along a production line. The conveyor belt 9 transports the workpiece 7 placed on the belt by rotating the belt. The robot 1 is installed in the working position facing the conveyor belt 9 in a state of being placed on the platform 3.

A robot operator teaches the robot 1 the transport route of the workpiece 7 along the conveyor belt 9 in a teaching operation. The robot operator sets the teaching position for teaching the robot 1 the transport route of the workpiece 7 in the robot 1.

The robot 1 performs a movement to pick up the workpiece 7 that is moving on the belt and a movement to place the workpiece 7 onto the rotating belt. At this point in time, the robot 1 performs a following movement to move the hand 6 in the same direction and at the same speed as the movement of the conveyor belt 9. The robot operator registers the teaching position for the following movement in the robot 1.

In the robot system that performs the following movement to follow the conveyor belt 9, when the robot 1 is reinstalled or relocated, a change may occur in the relation between the transport direction of the workpiece 7 along the conveyor belt 9 and the coordinate axes of the robot 1. When such a deviation occurs in the positional relation between the conveyor belt 9 and the robot 1, it becomes difficult for the robot 1 to match the following movement with the movement of the conveyor belt 9. Therefore, when the robot 1 is reinstalled or relocated, the robot operator sometimes performs the teaching operation for performing an accurate following movement.

When the robot 1 is reinstalled and when the robot 1 is relocated, the robot system according to the third embodiment corrects the direction in which the hand 6 is caused to perform the following movement instead of performing the teaching operation on the robot 1.

Figure 19:
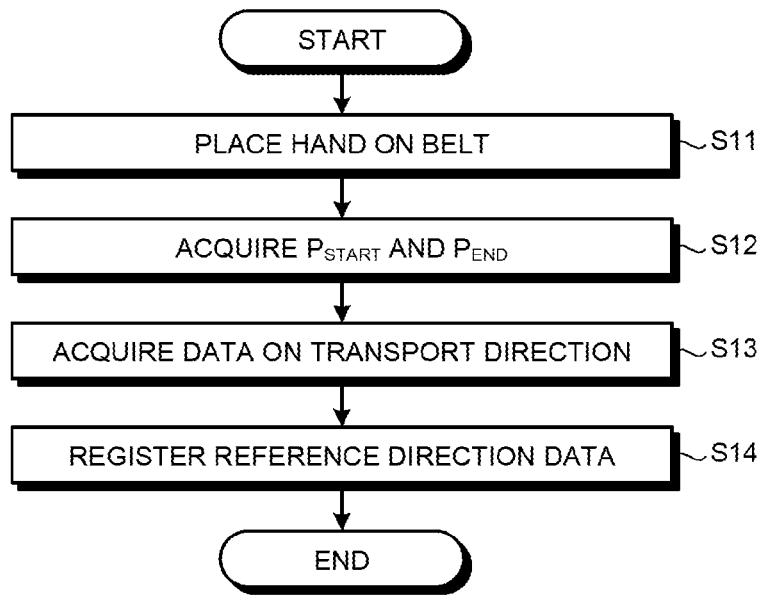
FIG. 19 is a flowchart illustrating an operation procedure of the robot system according to the third embodiment in a first process, which is advance preparation.

FIG. 19 is a flowchart illustrating an operation procedure of the robot system in a first process, which is advance preparation. After the robot 1 has been installed in the working position, the robot 1 performs the advance preparation. In the advance preparation, the robot 1 acquires reference position data representing the relation between the orientation of the main body 4 and the transport direction of the conveyor belt 9. In the third embodiment, the reference position data is also referred to as "reference direction data" where appropriate.

In the advance preparation, the control unit 11 controls the movement of the arms 5 and the hand 6 with the amount of control registered beforehand in the storage unit 13. By moving the arms 5 and the hand 6 under the control of the control unit 11, the robot 1 places the hand 6 on the conveyor belt 9 (Step S11). At this point in time, the conveyor belt 9 is rotated in the direction in which the workpiece 7 is transported.

When the hand 6 is placed on the belt, the control unit 11 moves the movable unit by following the external force detected by a force sensor (not illustrated) attached to the hand 6. Accordingly, the control unit 11 moves the hand 6 by following the drive force by which the conveyor belt 9 is rotated.

When a certain period of time has passed since the hand 6 was placed on the belt, the control unit 11 raises the hand 6 from the belt. Alternatively, when the hand 6 has moved a certain distance together with the belt, the control unit 11 may raise the hand 6 from the belt. The control unit 11 recognizes that the hand 6 has moved a certain distance on the basis of the amount of movement of the arm 5 since the hand 6 was placed on the belt. In addition, the control unit 11 may recognize that the hand 6 has moved a certain distance, on the basis of the result of the measurement of the position of the hand 6 by using a vision sensor (not illustrated). In this case, when the distance from the coordinates indicating the position of the hand 6 at the time of being placed on the belt to the coordinates indicating the position of the hand 6 after being moved has reached a certain distance, the control unit 11 raises the hand 6.

The control unit 11 acquires position data on a start position $P_{START}$ where the control unit 11 starts to move the hand 6 by following the movement of the belt, and position data on an end position $P_{END}$ where the control unit 11 ends moving the hand 6 (Step S12). The start position $P_{START}$ represents the position of the hand 6 on the conveyor belt 9 when the hand 6 is placed on the belt. The end position $P_{END}$ represents the position of the hand 6 on the conveyor belt 9 when the hand 6 is raised from the belt.

The control unit 11 obtains respective values of $X_S$, $Y_S$, and $\theta_S$ illustrated in FIG. 17 and a value of $Z_S$ illustrated in FIG. 18. $X_S$, $Y_S$, $Z_S$, and $\theta_S$ are position data on the start position $P_{START}$. $X_S$ is the distance in the X direction between the main body 4 and the hand 6. $Y_S$ is the distance in the Y direction between the main body 4 and the hand 6. The distance between the workpiece 7 and the hand 6 is the distance between the central position of the main body 4 in the XY directions and the central position of the hand 6 in the XY directions. $\theta_S$ is an angle between the straight line connecting the central position of the main body 4 and the start position $P_{START}$ and the Y axis. $\theta_S$ represents a direction of the start position $P_{START}$ with respect to the main body 4. The control unit 11 obtains the respective values of $X_S$, $Y_S$, and $\theta_S$ on the basis of the result of the measurement of the position of the hand 6 by using a vision sensor (not illustrated).

$Z_S$ is the height of the hand 6 with respect to the main body 4 in the Z direction. The height of the hand 6 with respect to the main body 4 is the height from the surface of the platform 3 on which the main body 4 is placed to the surface of the belt on which the hand 6 is placed. The control unit 11 obtains the value of $Z_S$ on the basis of the result of the measurement of the position of the hand 6 by using a contact sensor (not illustrated). The sensor that measures the position of the hand 6 is not limited to the contact sensor. The sensor can be a sensor that detects that the workpiece 7 is held by the hand 6.

The control unit 11 obtains respective values of $X_E$, $Y_E$, and $\theta_E$ illustrated in FIG. 17 and a value of $Z_E$ illustrated in FIG. 18. $X_E$, $Y_E$, $Z_E$, and $\theta_E$ are position data on the end position $P_{END}$. The control unit 11 obtains the position data on the end position $P_{END}$ ($X_E$, $Y_E$, $Z_E$, and $\theta_E$) in the same manner as for the position data on the start position $P_{START}$ ($X_S$, $Y_S$, $Z_S$, and $\theta_S$).

The control unit 11 acquires data on the transport direction of the conveyor belt 9 on the basis of the position data on the start position $P_{START}$ ($X_S$, $Y_S$, $Z_S$, and $\theta_S$) and the position data on the end position $P_{END}$ ($X_E$, $Y_E$, $Z_E$, and $\theta_E$) (Step S13). The transport direction is a direction in which the hand 6 placed on the belt is transported, and is represented by the direction of a vector from the start position $P_{START}$ toward the end position $P_{END}$. It is assumed that the data on the transport direction is position data defined by using the coordinate axes of the robot 1, and represents the inclination in the XYZ directions of the vector from the start position $P_{START}$ toward the end position $P_{END}$.

The control unit 11 registers the data on the transport direction acquired at Step S13 in the storage unit 13 (Step S14). The data on the transport direction acquired at Step S13 is reference direction data. Then, the robot system ends the advance preparation. After the advance preparation, the robot 1 operates in the state where the robot 1 remains installed in the working position when the advance preparation was performed.

Figure 20:
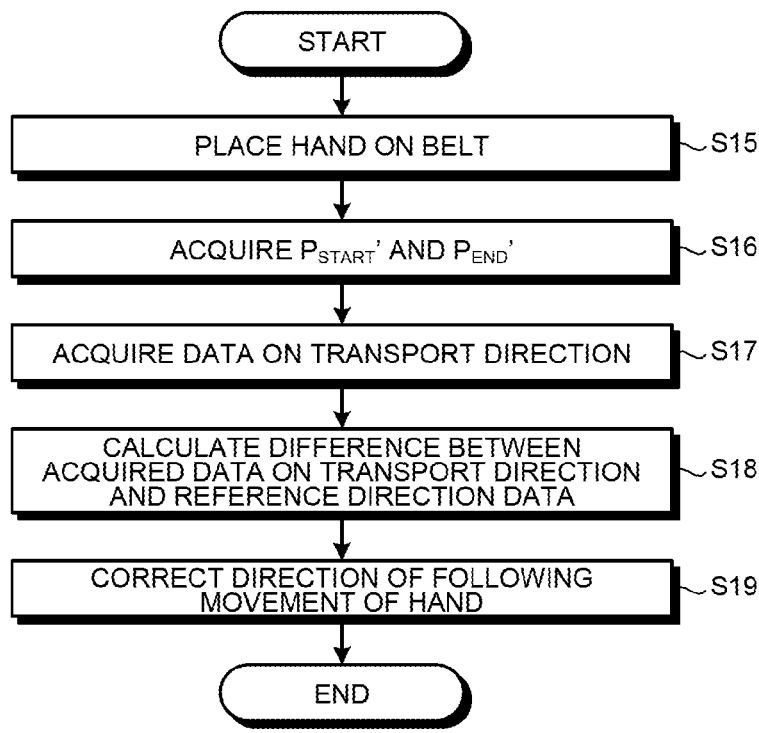
FIG. 20 is a flowchart illustrating an operation procedure of the robot system according to the third embodiment in a second process after the robot has been installed.
Figure 21:
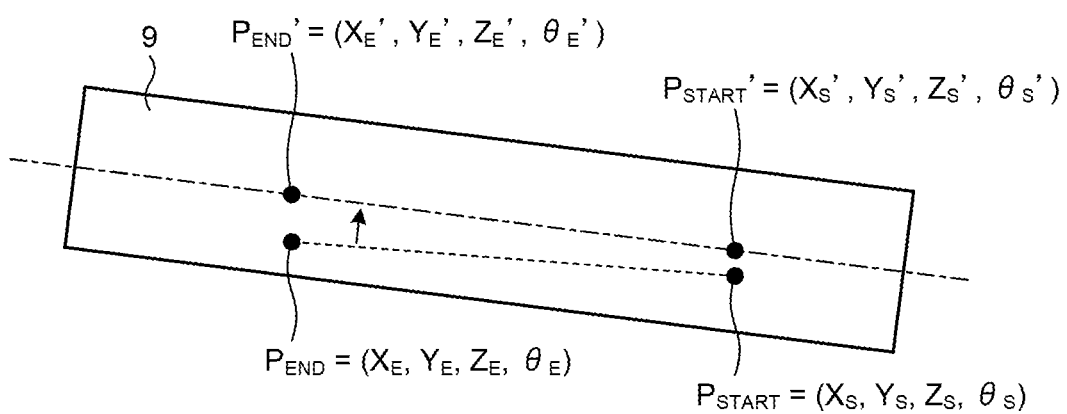
FIG. 21 is an explanatory diagram of correction of a direction in which a hand is caused to perform a following movement in the robot system according to the third embodiment.

FIG. 20 is a flowchart illustrating an operation procedure of the robot system in a second process after the robot has been installed or relocated. FIG. 21 is an explanatory diagram of correction of the direction in which a hand is caused to perform a following movement.

The control unit 11 controls the movement of the arms 5 and the hand 6 with the amount of control registered beforehand in the storage unit 13, as in the case of the advance preparation. By moving the arms 5 and the hand 6 under the control of the control unit 11, the robot 1 places the hand 6 on the conveyor belt 9 (Step S15). At this point in time, the conveyor belt 9 is rotated in the direction in which the workpiece 7 is transported.

The control unit 11 moves the hand 6 by following the force with which the conveyor belt 9 is rotated, as in the case of the advance preparation. When a certain period of time has passed since the hand 6 was placed on the belt or when the hand 6 has moved a certain distance together with the belt, the control unit 11 raises the hand 6 from the belt.

The control unit 11 acquires position data on the start position $P_{START}'$ where the control unit 11 starts to move the hand 6 by following the movement of the belt and position data on the end position $P_{END}'$ where the control unit 11 ends moving the hand 6 by following the movement of the belt (Step S16).

The control unit 11 acquires position data on the start position $P_{START}'$ ($X_S'$, $Y_S'$, $Z_S'$, and $\theta_S'$), as in the case when the position data on the start position $P_{START}$ ($X_S$, $Y_S$, $Z_S$, and $\theta_S$) was acquired in the advance preparation. The control unit 11 acquires position data on the end position $P_{END}'$ ($X_E'$, $Y_E'$, $Z_E'$, and $\theta_E'$), as in the case when the position data on the end position $P_{END}$ ($X_E$, $Y_E$, $Z_E$, and $\theta_E$) was acquired in the advance preparation.

The control unit 11 acquires data on the transport direction of the conveyor belt 9 on the basis of the position data on the start position $P_{START}'$ ($X_S'$, $Y_S'$, $Z_S'$, and $\theta_S'$) and the position data on the end position $P_{END}'$ ($X_E'$, $Y_E'$, $Z_E'$, and $\theta_E'$) (Step S17). The transport direction is represented by the direction of the vector from the start position $P_{START}'$ toward the end position $R_{END}'$. It is assumed that the data on the transport direction is position data defined by using the coordinate axes of the robot 1, and represents the inclination in the XYZ directions of the vector from the start position $P_{START}'$ toward the end position $P_{END}'$.

The control unit 11 reads the reference direction data registered at the Step S14 from the storage unit 13. The control unit 11 calculates the difference between the data on the transport direction acquired at Step S17 and the reference direction data (Step S18).

The difference acquired at Step S18 corresponds to the amount of change of the orientation of the robot 1 with respect to the transport direction of the conveyor belt 9. That is, the difference represents the amount of deviation between the orientation in which the robot 1 is installed at the time of the advance preparation and the orientation of the robot 1 when the robot 1 is reinstalled or relocated. The control unit 11 registers the difference calculated at Step S18 in the storage unit 13.

After the difference has been registered in the storage unit 13, the control unit 11 corrects the direction of the hand 6 for performing the following movement on the basis of the difference read from the storage unit 13 (Step S19). By correcting the teaching position registered for the following movement, the control unit 11 corrects the direction of the following movement. The control unit 11 controls the movement of the arms 5 and the hand 6 such that the hand 6 performs the following movement in the corrected direction.

According to the third embodiment, when the robot 1 is reinstalled or relocated, the robot system corrects the direction of the hand 6 for performing the following movement in accordance with the transport direction of the conveyor belt 9. Accordingly, the robot operator does not need to perform the teaching operation when the robot 1 is reinstalled and when the robot 1 is relocated, and can correct the teaching position registered in the robot with less laborious work regardless of the operator's skill in handling the robot 1.

The robot system is assumed to automatically perform each operation in the advance preparation after the robot 1 has been installed at the working position and each operation after the robot 1 has been reinstalled or relocated by executing a program. By executing the program, the robot system can automatically perform the series of operations performed for correction the series of the transport route of the workpiece 7.

In the robot system, it is also possible to perform correction of a teaching position in both the first and second embodiments.

REFERENCE SIGNS LIST

1 robot, 2 vision sensor, 3 platform, 4 main body, 5 arm, 6 hand, 7 workpiece, 8 stage, 9 conveyor belt, 11 control unit, 13 storage unit, 14 drive unit, platform, 20 contact sensor.

The invention claimed is:

1. A robot system comprising
 a robot including
  a main body,
  a movable unit that is coupled to the main body and that picks up and transports a workpiece,
  a control unit that controls a movement of the movable unit, and
  a storage unit that stores therein data for control of the movable unit in the control unit; and
 a sensor that has a fixed position relative to the main body and that measures a position of the workpiece, wherein
 a teaching position for teaching the robot a transport route of a workpiece is registered in the storage unit,
 in advance preparation of the robot installed in a working position, the sensor measures a position of a workpiece picked up by the movable unit by making a movement based on an amount of control registered in the storage unit and the control unit registers in the storage unit reference position data representing a positional relation between a workpiece picked up by the movable unit and the main body,
 when the robot moved from the working position is reinstalled in the working position or when the robot is relocated from the working position to another working position,
 the sensor measures a position of a workpiece picked up by the movable unit by making a movement based on the amount of control and the control unit registers a difference between position data representing a positional relation between a workpiece picked up by the movable unit and the main body and the reference position data in the storage unit, and
 the control unit corrects the teaching position on a basis of the difference read from the storage unit.

2. The robot system according to claim 1, wherein
 the main body is placed on a platform, and
 the sensor is fixed to the platform.

3. The robot system according to claim 1, wherein the sensor is fixed to the main body.

4. The robot system according to claim 1, wherein
 the sensor measures a position of a workpiece in two dimensions, and
 the control unit corrects the teaching position in the two dimensions.

5. The robot system according to claim 4, wherein
 the sensor further measures a position of a workpiece in a height direction vertical to the two dimensions, and
 the control unit corrects the teaching position with respect to three dimensions that include the height direction and the two dimensions.

6. A robot system comprising
 a robot including
  a main body,
  a movable unit that is coupled to the main body and that picks up and transports a workpiece,
  a control unit that controls a movement of the movable unit, and
  a storage unit that stores therein data for control of the movable unit in the control unit, wherein
 the robot is installed in a working position facing a conveyor belt that transports a workpiece,
 the movable unit includes a hand that holds a workpiece and an arm coupled to the main body and the hand, and performs a following movement to move the hand by following the conveyor belt,
 a teaching position for teaching the robot a transport route of a workpiece is registered in the storage unit,
 in advance preparation of the robot installed in a working position, the movable unit places the hand on the conveyor belt by making a movement based on an amount of control registered in the storage unit and moves the hand by following a drive force of the conveyor belt, and the control unit registers reference position data representing a relation between an orientation of the main body and a transport direction of the conveyor belt in the storage unit,
 when the robot moved from the working position to another working position is reinstalled in the working position or when the robot is relocated from the working position to another working position, the movable unit places the hand on the conveyor belt by making a movement based on the amount of control and moves the hand by following a drive force of the conveyor belt, and the control unit registers a difference between position data representing a relation between an orientation of the main body and a transport direction of the conveyor belt and the reference position data in the storage unit, and
 the control unit corrects a direction in which the hand is caused to perform a following movement by correcting the teaching position on a basis of the difference read from the storage unit.

7. The robot system according to claim 6, wherein the control unit obtains data on the transport direction on a basis of data on a position where the control unit starts to move the hand by following the drive force and data on a position where the control unit ends moving the hand by following the drive force.

8. A control method for a robot system including a robot that includes a main body and a movable unit that is coupled to the main body and that picks up and transports a workpiece, the control method comprising:
 a first process that is performed in advance preparation of the robot installed in a working position; and a second process that is performed when the robot moved from the working position is reinstalled in the working position and when the robot is relocated from the working position to another working position, wherein
a teaching position for teaching a transport route of a workpiece is registered beforehand in the robot,
the first process includes
- a step of measuring, by using a sensor that has a fixed position relative to the main body, a position of a workpiece picked up by the movable unit by making a movement based on an amount of control that is registered, and
- a step of registering reference position data representing a positional relation between a workpiece picked up by the movable unit and the main body the second process includes
- a step of measuring, by using the sensor, a position of a workpiece picked up by the movable unit by making a movement based on the amount of control, and
- a step of registering a difference between position data representing a positional relation between a workpiece picked up by the movable unit and the main body and the reference position data, and
- the teaching position is corrected on a basis of the difference that is registered.

9. A control method for a robot system including a robot that includes a main body, a hand that holds a workpiece, and an arm that is coupled to the main body and the hand, and installed in a working position facing a conveyor belt that transports a workpiece, the control method comprising:

a first process that is performed in advance preparation of the robot installed in a working position; and
a second process that is performed when the robot moved from the working position is reinstalled in the working position or when the robot is relocated from the working position to another working position, wherein
a teaching position for teaching a transport route of a workpiece is registered beforehand in the robot,
the first process includes
- a step of placing the hand on the conveyor belt by making a movement based on an amount of control that is registered and moving the hand by following a drive force of the conveyor belt, and
- a step of acquiring reference position data representing a relation between an orientation of the main body and a transport direction of the conveyor belt, the second process includes
- a step of placing the hand on the conveyor belt by making a movement based on the amount of control and moving the hand by following a drive force of the conveyor belt, and
- a step of registering a difference between position data representing a relation between an orientation of the main body and a transport direction of the conveyor belt and the reference position data, and
in a following movement to move the hand by following the conveyor belt, a direction in which the hand is caused to perform a following movement is corrected by correcting the teaching position on a basis of the difference that is registered.

* * * * *